(12) United States Patent
Iversen (10) Patent No.: US 10,756,667 B2
(45) Date of Patent: Aug. 25, 2020

(54) SOLAR CELL POLE MOUNTING APPARATUS

(71) Applicant: Brian Iversen, Charlotte, NC (US)

(72) Inventor: Brian Iversen, Charlotte, NC (US)

( * ) Notice: Subject to any disclaimer, the term of this patent is extended or adjusted under 35 U.S.C. 154(b) by 200 days.

(21) Appl. No.: 16/034,348

(22) Filed: Jul. 12, 2018

(65) Prior Publication Data

US 2019/0020300 A1    Jan. 17, 2019

Related U.S. Application Data

(60) Provisional application No. 62/531,757, filed on Jul. 12, 2017, provisional application No. 62/544,716, filed on Aug. 11, 2017.

(51) Int. Cl.
| | |
|---|---|
| *H02S 10/40* | (2014.01) |
| *F21S 9/03* | (2006.01) |
| *H02S 40/38* | (2014.01) |
| *H02S 30/20* | (2014.01) |
| *H02S 30/10* | (2014.01) |
| *H01M 10/46* | (2006.01) |

(52) U.S. Cl.
CPC ........... *H02S 10/40* (2014.12); *H01M 10/465* (2013.01); *H02S 30/10* (2014.12); *H02S 30/20* (2014.12); *H02S 40/38* (2014.12); *F21S 9/035* (2013.01)

(58) Field of Classification Search
CPC .......... H02S 10/40; H02S 40/38; H02S 30/20; H02S 30/10; H01M 10/465; F21S 9/035; F21W 2131/103; Y02B 20/72
See application file for complete search history.

(56) References Cited

U.S. PATENT DOCUMENTS

| | | | | |
|---|---|---|---|---|
| 3,705,300 | A * | 12/1972 | Plemmons | F21S 8/088 362/235 |
| 8,749,449 | B2 * | 6/2014 | Caldwell | H01Q 1/1242 343/890 |
| 9,252,479 | B2 * | 2/2016 | Kolokotronis | H01Q 1/1242 |
| 2014/0360559 | A1 * | 12/2014 | Braghiroli | H02S 30/10 136/251 |
| 2015/0043200 | A1 * | 2/2015 | Wilson | F21S 9/035 362/145 |
| 2017/0104441 | A1 * | 4/2017 | Swan | F24S 25/70 |

* cited by examiner

*Primary Examiner* — Michael C Zarroli
(74) *Attorney, Agent, or Firm* — Daniel Becker; Olive Law Group, PLLC (57) ABSTRACT

A solar cell mounting apparatus and methods for supporting solar panel sets on a pole. The invention contemplates both vertical and horizontal cell support arrangements and embodiments configured to installation in urban areas and embodiments providing protection of components in high wind areas.

22 Claims, 6 Drawing Sheets

SOLAR CELL POLE MOUNTING APPARATUS

CLAIM TO PRIORITY, PRIOR FILED APPLICATIONS

This application claims the benefit of priority under 35 USC 120, of the following provisional applications: "Vertical Solar Power", application No. 62/531,757, filed Jul. 12, 2017, and "Solar Power Around a Vertical Pole", application No. 62/544,716, filed Aug. 11, 2017. Both applications were filed in the name of the inventor, as applicant, Brian Iversen, and the applicant of this application is also Brian Iversen.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD

At least some embodiments disclosed herein relate, in general, to solar cell electricity and photovoltaics and mobile energy generation devices and weatherproofing point-of-power-generation methods and apparatuses, and specifically to mounts and adapters and handling of mobile solar cells.

BACKGROUND

Background from "solar power around a vertical pole": "Some people may use generators are solar panels as an alternative power source. Unfortunately, generators are noisy, require fuel, and are generally undesirable, whereas solar panels require large amounts of space to arrange solar panels side-by-side to generate a sufficient amount of power. This can limit solar panel power generation to only select areas with wide-open spaces, preventing many people from installing solar panels in their backyards, cities, and other places where space is at a premium. An efficient alternative is desired."

SUMMARY

The prior provisional applications gave descriptions of exemplary notions of the present invention. They follow here, in addition to inclusion in the record by the claim of priority:

Solution from "Vertical Solar Power":

"Renewable energy is energy that is collected from renewable resources, which are naturally replenished by sunlight, wind, rain, tides, waves, and geothermal heat. Renewable energy often provides energy in for important areas: electricity generation, air and water heating/cooling, transportation, and rule energy services. Renewable energy resources and significant opportunities for energy efficiency exist over wide geographical areas.

The present invention provides a vertical pole that supports multiple solar panels in a stacked configuration. This provides a larger quantity of solar power per square foot than conventional power production. It includes a grid wire on top of the pole to connect to a power grid, as well as multiple collars in a layered pattern to install the solar panels. This further allows installation in small spaces, cities, backyard, and other areas that are unfit for traditional solar farms. The present invention with stands high winds for use in any climate."

Solution from "Solar Power On A Vertical Pole":

"Many people are turning to solar panels as a source of electricity. Solar panel refers to a panel designed to absorb the sun's rays for energy. Some of the most efficient solar panels are connected assemblies of typically 6×10 photovoltaic solar cells. A single solar module can produce only a limited amount of power, so most installations contain multiple modules.

The present invention supplies quiet renewable energy in a three-dimensional vertical array. It features several layers that extend outward from a vertical pole, offset at a slight angle, to catch the sun's rays. It includes a staggered formation that minimizes overlap and shadowing on the panels below. This produces more power per square foot than conventional means. The present invention allows installation in small spaces, cities, backyard, and other areas that are unfit for traditional solar farms."

Below is a list of several contemplated embodiments, and is specifically additionally included to support the language of the claims, to supplement the rest of the subject matter above, in the detailed description, and to provide several points of literal support:

1. An apparatus, comprising: A solar cell pole mounting device, the device comprising:
   an inner support, an outer support, and a radial spacer mechanism,
   the inner support being adapted to locate the device to a desired position along the length of a pole,
   the outer support being adopted to locate solar cells in spaced relation to the inner support,
   spaced relation meaning arranged at a distance from the pole at a greater radial distance than the radial distance of the inner support and each of the inner and outer supports extending for an approximately equal angular length about the pole,
   the inner support being assembled and arranged to locate the device by radially-inward forceful engagement with respect to the peripheral face of the pole,
   the outer support being assembled and arranged to locate the sales by providing plural supporting features spaced at angularly offset intervals along the length of the outer support,
   such that the upper edge of the cells are proximate the location of the outer support, along the length of the pole, and
   the radial spacer mechanism being one assembled and arranged to suspend the outer support in spaced relation to the inner support, and limit the outer support against movement relative to the inner support.

2. The apparatus of claim 1, wherein the inner support is alternately sizeable, alternately sizeable meaning with reference to the diameter of the pole.

3. The apparatus of claim 2, wherein the inner support is alternately sizeable by being adapted to be alternately sized between a size that is radially-larger-than and a size that is radially-fitting-to the diameter of the pole, by comprising a ring of material of sufficient pliancy to be alternately sized and of sufficient strength to be secured to the pole, when sized to as to be radially-fitting-to the diameter of the pole.

4. The apparatus of claim 3, wherein the inner support is sizeable to a size that is radially fitting to the diameter of the pole, by the ring of material comprising a belt that is sizeable by being circumferentially shortenable.

5. The apparatus of claim 3, wherein the inner support is sizeable to a size that is radially fitting to the diameter of the pole, by the ring of material comprising an alternately tightenable and openable clamp, one selected from a list comprising a hose clamp, a band hose clamp, a barrel band clamp, a jubilee clamp, a wormgear clamp, a t-bolt clamp, and a pipe hanger clamp.

6. The apparatus of claim 3, wherein the cells are arranged vertically into sets, each set being disposed on a plane for each set, each plane having a left and right edge, each right edge of a plane abutting the left edge of another of the planes, the planes being arranged about the pole, each plane facing a direction that is angularly offset from the directions faced by the planes which abut the edges of said plane.

7. The apparatus of claim 6, wherein the planes are of a quantity and size that they encircle and circumscribe the diameter of the outer support.

8. The apparatus of claim 7, wherein the planes fully encircle the pole and enclose an interior volume, whereby the interior volume of a size that is sufficiently large to contain electrical components necessary to provide electricity to any other electrical apparatus suitable to be powered by the apparatus.

9. The apparatus of claim 8, wherein the interior volume is resistant to severe weather by the cells being rigid laminated cells, such that the cells provide protection against hurricane force winds and debris and solar exposure, whereby the device is adapted to fully contain its electronics within the interior volume and serve as a weather protecting housing.

10. The apparatus of claim 1, wherein the radial spacer mechanism is alternately sizable to a desired distance to radially space the outer support, with respect to the inner support, such that the outer support is sized to support and locate a desired size and specification of foldable solar cell panel sets, and such that the inner support is sized to a desired pole at a position along the pole which corresponds to the position along the pole of the outer support.

11. The apparatus of claim 1, the solar cells having an upper and lower edge, the outer support being an upper outer support, and the apparatus further comprising a lower outer support, wherein upper outer support engages with the upper edge of the solar cells and wherein the lower outer support engages with the lower edge of the solar cells, such that the upper outer support and lower outer support locate the upper and lower edges of the solar cells at desired radial distance from the pole.

12. The apparatus of claim 1, wherein the apparatus is modularly scalable with respect to the pole, by comprising plural instances of the devices, the devices being supplementarily interrelatable by being located to a common pole, such that the devices are co-extensive with respect to the size and shape of each of the devices, along the length of the pole.

13. The apparatus of claim 12, the solar cells having an upper and lower edge, and the devices being further co-extensive, co-extensive meaning the devices are successively arranged above and below one another along the length of the pole, the upper edge of the solar cells and outer supports being engaged for each respective support, by the lower edge of the solar cells being engaged with the outer support of one of the devices that is below the device to which its upper edge is engaged, respectively.

14. The apparatus of claim 1, wherein the apparatus is modularly scalable with respect to the pole, by comprising battery storage units that are that are sized and shaped to abut and be co-extensive with the device along the length of the pole, with respect to the size and shape of the outer support and solar cells.

15. The apparatus of claim 1, wherein the outer support and inner support are assembled and arranged to be alternately opened and closed, such that each device is adapted to receive the diameter of the pole by radial entry through the outer and inner supports when opened, and is adapted to locate the pole against radial exit from the inner and outer supports when closed.

16. The apparatus of claim 1, wherein the solar cells of each device are arranged vertically into sets, each set being disposed on a plane for each set, the planes of each device being parallel to one another and the planes each being arranged at an angle to the length of the pole which is one selected from a list comprising approximately perpendicular to the length of the pole and approximately perpendicular to gravity, each of the devices also being arranged such that the planes are angularly spaced about the pole, the spaces between the plane being angular spaces.

17. The apparatus of claim 16, the apparatus comprising plural devices, the devices being spaced at intervals along the length of the pole and angularly offset about the pole with respect to one another, such that the angular spaces between the panel sets of each device do not occlude the solar exposure of the device respectively below, and is not occluded from solar exposure by the shadow of the panel sets of the device respectively above.

18. The apparatus of claim 17, wherein each of the panels comprise an upper edge and a lower edge, the outer support being adapted to locate each upper edge at approximately the same location along the length of the pole as the location of the inner support along the length of the pole, and wherein the apparatus supports the panel sets, such that the lower edge of each panel at a location, with respect to the length of the pole which is approximately the same location as the location of the upper edge.

19. The apparatus of claim 18, wherein the apparatus supports the panel sets by each device providing cantilever support to the panels of each respective device.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

A brief list of several elements with reference numerals. This list is non-limiting on both the claims and the disclosure in this application. Any component or step or other element which can be understood from this application or which would be understood to be supported in view of the art by one having skill in the relevant art in view of this application are elements that are claimable and are not disclaimed by providing this exemplary list. This list is provided purely for convenience and clarity of examining the figures.

1. Device
2. Inner support
3. Outer support
4. Radial spacer
5. Upper edge
6. Cells
7. Lower edge
8. Panels
9. Sets
10. Pole
11. Battery unit,
12. Upper edge of lower device panels
13. Lower edge of lower device panels
14. Lower device
15. Cells of lower device
16. Sets of lower device
17. Panels of lower device
18. Multiple diameter pole
19. Attachment features
20. Interior volume
21. Lower inner support
22. Lower radial spacer
23. Lower outer support
24. Attachment features of lower support
25. Lower device inner support ("upper" inner support where applicable)
26. Lower device radial spacer ("upper" radial spacer where applicable)
27. Lower device outer support ("upper" outer support where applicable)
28. Interior volume of lower device
29. Lower device lower inner support
30. Lower device lower radial spacer
31. Lower device lower outer support
32. Attachment features of upper outer support of lower device
33. Attachment features of lower outer support of lower device Referring now to the figures: All show exemplary embodiments of a solar cell pole mounting apparatus. Each of the figures shows at least one device 1. The device 1 is a solar cell mounting device, having an inner support 2, an outer support 3, and a radial spacer 4. The apparatus supports solar cells 6, These cells 6 arrange sets 9 of solar cells on panels 8. The sets 9 are referred to as arranging the cells 6 "vertically," because each panel is referred to as having an upper edge 5, a lower edge 7, and a left and right edge.

Figure 1:
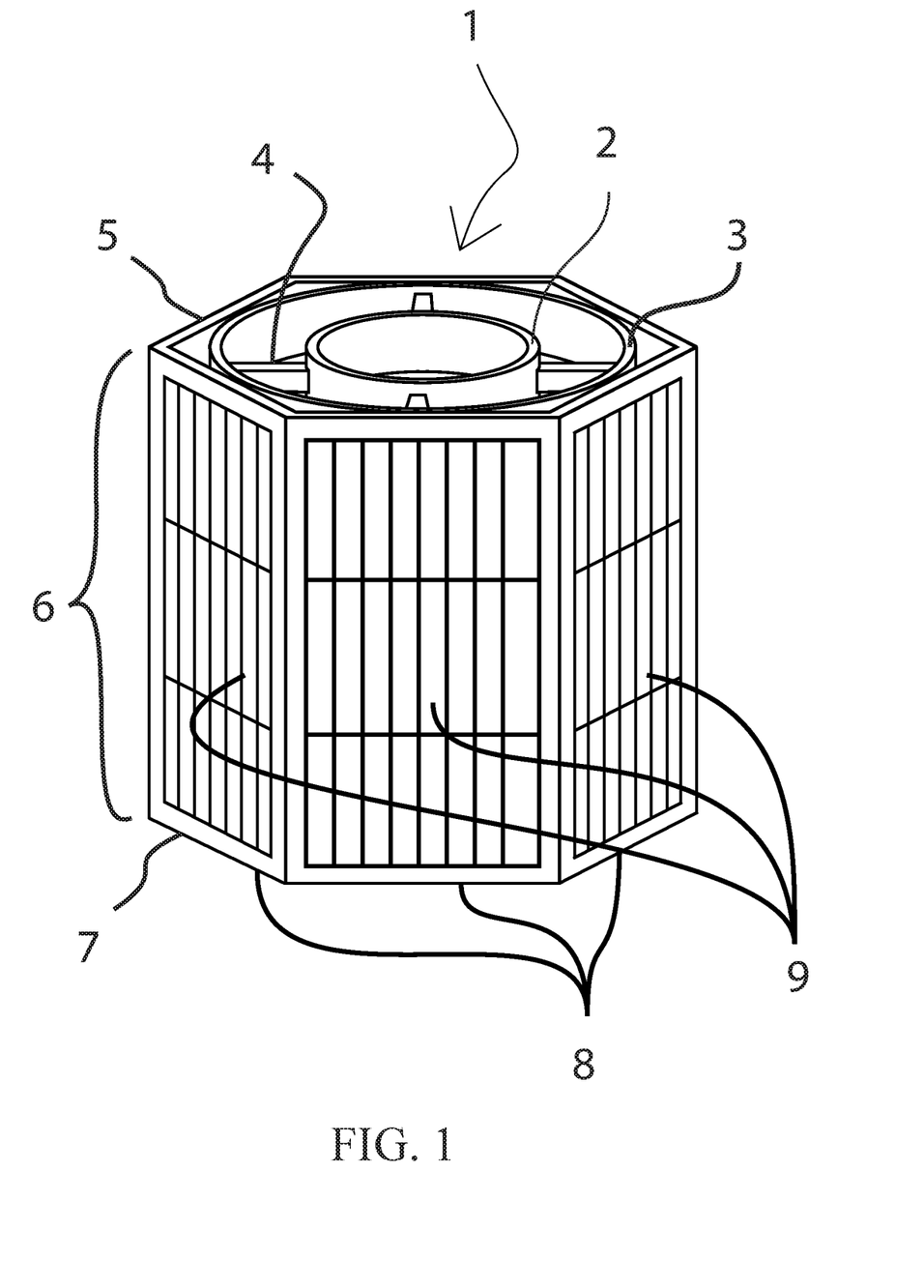
FIG. 1 shows a perspective view of a solar cell pole mounting device, in accordance with the present disclosure.

Referring now to FIG. 1, only an exemplary embodiment of the device 1 is shown, in the abstract from any pole. The panels 8 are arranged in such a way that they circumscribe the outer support 3, and the upper edge 5 is arranged around the outside of the outer support 3.

Figure 2:
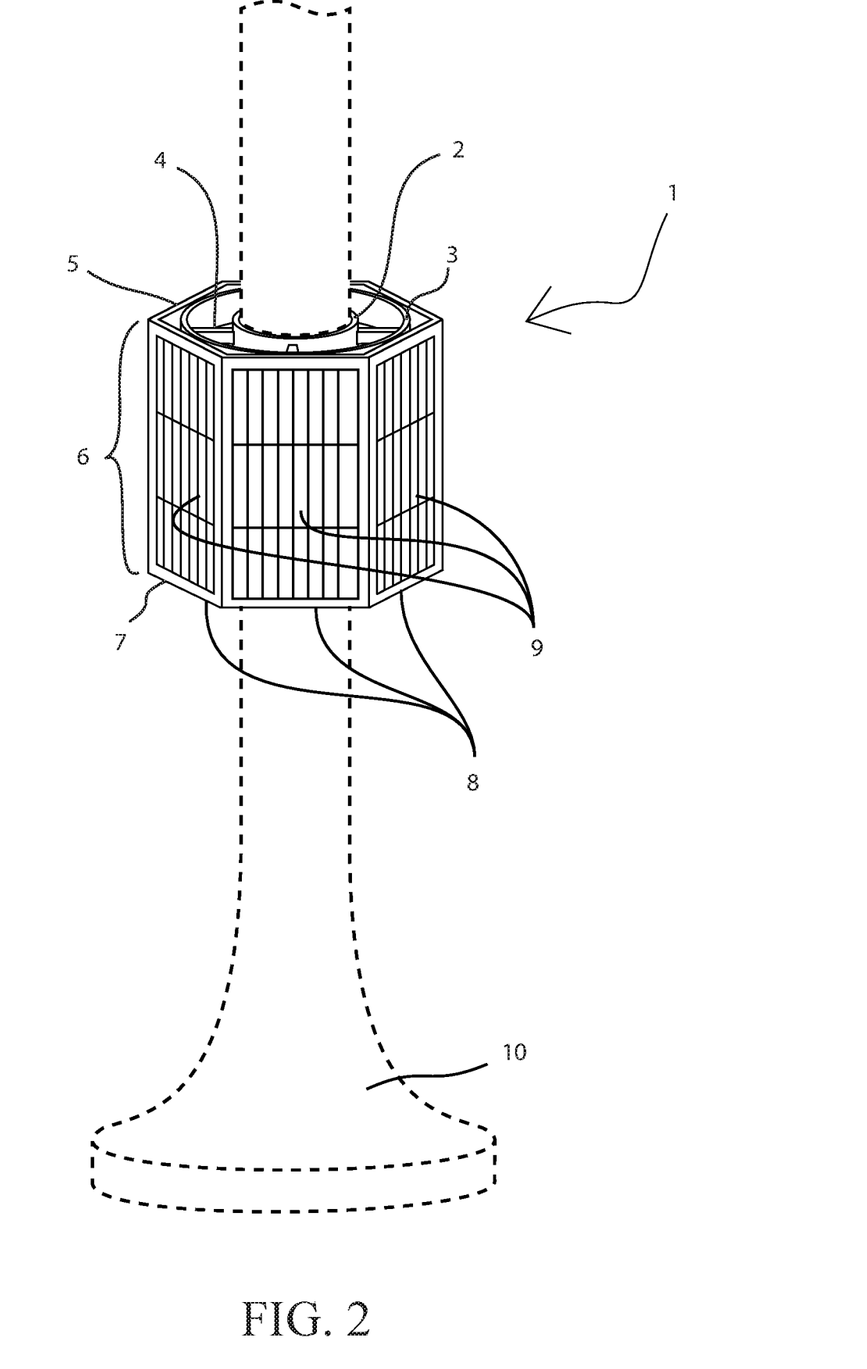
FIG. 2 shows a perspective view of a solar cell pole mounting apparatus, with a solar cell pole mounting device installed on a pole, in accordance with the present disclosure.

Referring now to FIG. 2, a similar embodiment to that of FIG. 1 is shown mounted on a pole 10.

Here, it can be seen that the inner support 2 mounts the apparatus by being sizable to the diameter of the pole 10, such that it locates the device 1 against movement from a desired location along the length of the pole 10. The outer support 3 holds the panels 8 at a desired distance from the pole 10, against deflection relative to the pole 10, and provides them with secure location proximate to the location of the inner support 2, with respect to its location along the length of the pole 10. The radial spacer 4 maintains the distance between the inner support 2 and the outer support 3, such that the outer support 3 does not deviate from its desired distance from the pole 10. In many preferred embodiments, the radial spacer 4 may be any radial spacer mechanism that is adapted to allow either or both of the outer support 3 and inner support 2 to be alternately sizable. The inner support 2 is alternately sizable to engage with poles of varying or alternative sizes of diameter, and the outer support 3 is alternately sizable to provide a desired number of panels 8 at a desired distance from a pole.

One contemplated desired embodiment (not shown) allows the inner support 2 to be sizable to a diameter of the pole 10 by comprising a belt that is circumferentially shortenable. However, any known form of providing a radially-inward forceful engagement with respect to the outer face of a post or pole is adequate for the inner support 2 to locate the device 1 to a desired location along the length of the pole 10, including hose clamps, band clamps, band hose clamps, barrel band clamps, jubilee clamps, worm gear clamps, T bolt clamps, pipe hanger clamps, and other equivalents.

Figure 3:
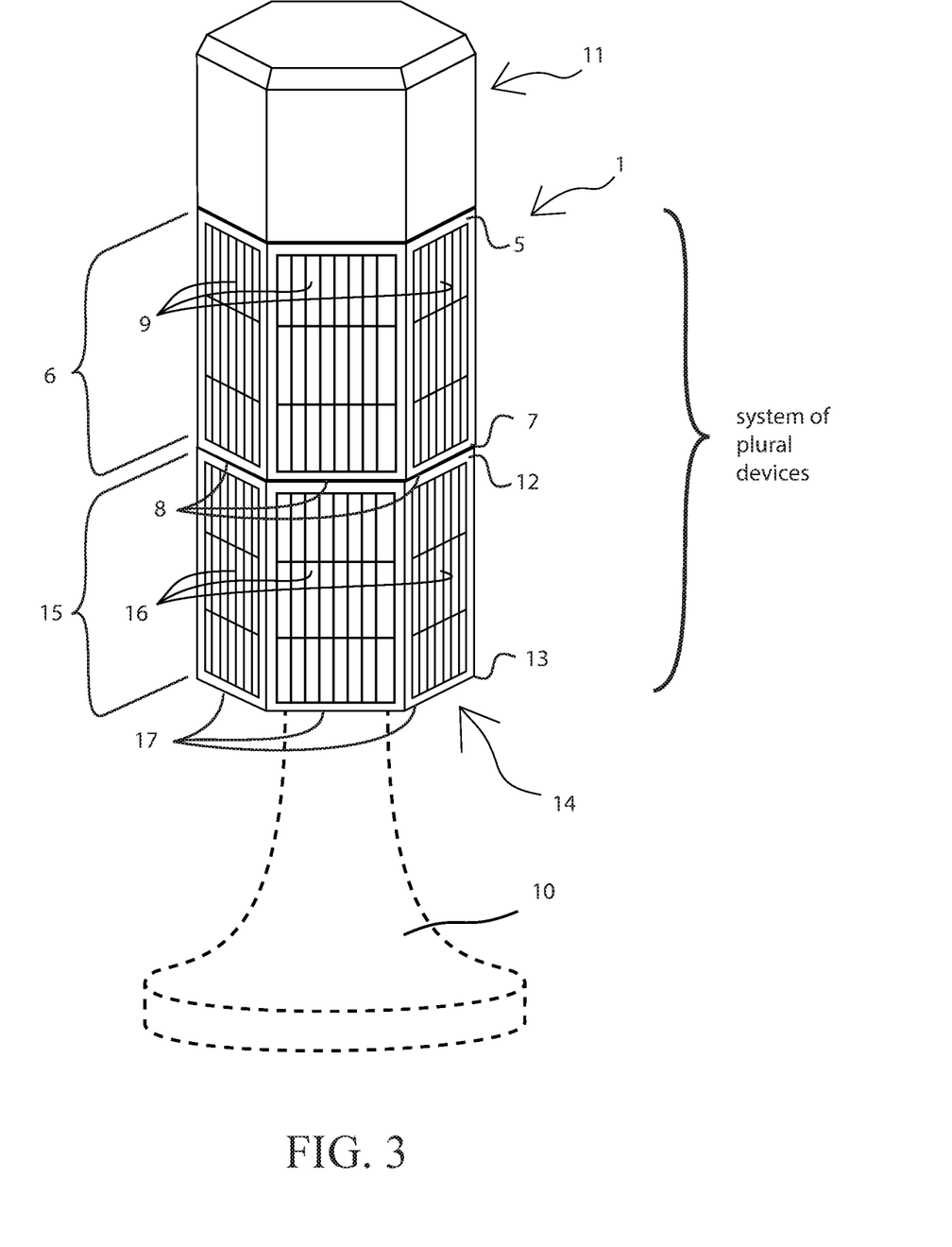
FIG. 3 shows a perspective view of a solar cell pole mounting apparatus with plural solar cell pole mounting devices installed on a pole, and with a battery storage unit coextensively abutting the devices along the length of the pole, in accordance with the present disclosure.

Referring now to FIG. 3, there is shown a version of the apparatus which comprises plural devices: device 1, and lower device 14. The devices 1 and 14 abut one another along the length of the pole 10, and are sized and shaped to be co-extensive. Lower device 14 has its own panels 17, with upper edge 12, lower edge 13, cells 15, and sets 16.

The present invention contemplates that the apparatus will be modularly scalable, and this includes embodiments that are able to store electrical energy at the side of the apparatus. The battery unit 11 allows for storage of electrical energy on the pole 10 that abuts and is coextensive with other devices 1 and 14. Other embodiments of the battery unit contemplated otherwise securely locate to the electronics necessary to facilitate storage of electrical energy at a desired location along the length of the pole 10. For example, the battery unit 11 shown in FIG. 3 sits atop the pole 10. Other exemplary embodiments may be concentric with the panels (8 and 17) and/or outer supports, or be contained within a coextensive and/or abutting housing which does not need to sit atop the pole 10, and is otherwise similarly alternately locatable in the manner of devices 1 and 14.

Figure 4:
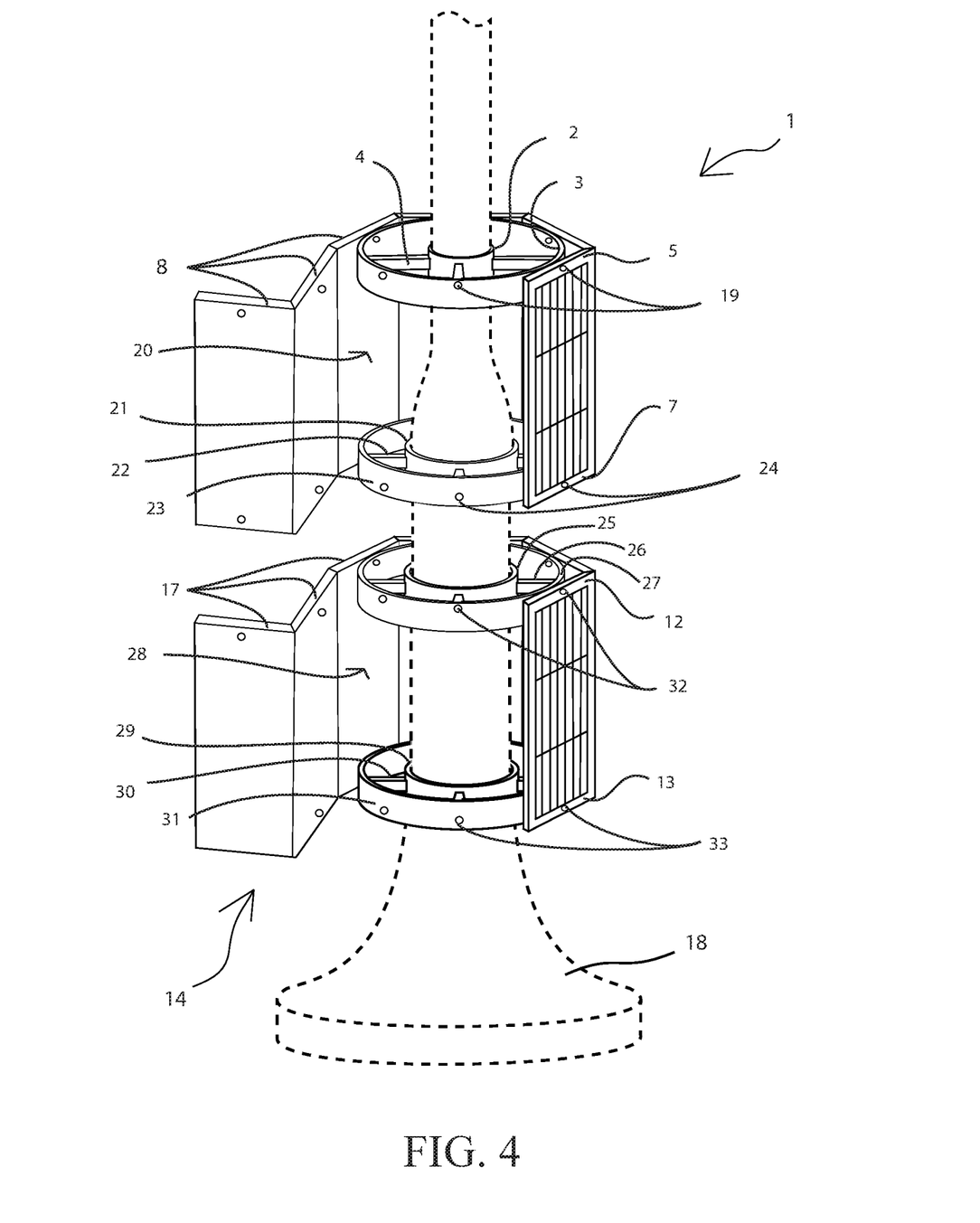
FIG. 4 shows a perspective view of a solar cell pole mounting apparatus with plural solar cell pole mounting devices installed on a pole, and with solar cell panels opened, to show an interior volume.

Referring now to FIG. 4, the devices 1 and 14 are fit to a multiple-diameter pole 18. The device 1 is fitted with upper (2 and 3) and lower supports (21 and 23) (outer support 3, inner support 2, and radial spacer 4 are "upper" for purposes of this figure).

Comparing the upper inner support 2 and lower inner support 21, we can see that the inner supports (2 and 21) being alternately sizable allows for the device 1 to engage a pole 18 having varying diameter without affecting the device's (1's) ability to provide a desired radial distance for the outer support. The radial spacer 4 allows the inner support 2 and outer support 3 to each be independently a desired respective size, because the radial spacer 4 is sizable to span the alternately varying distances between the inner support 2 and outer support 3, and is apparent by comparison to its shorter distance in the context of lower radial spacer 22, between lower inner support 21 and lower outer support 23.

The panels 8 are shown open, revealing the attachment features 19 disposed on the upper outer support 3. In this figure, the panels 8 engage their upper edge 5 with these features 19, while their lower edge 7 engages with corresponding attachment features 24 on the lower outer support 23.

The panels 8, when engaged with the attachment features 19 and 24, enclose an interior volume 20. Electronics and electrical components can thereby be stored within the apparatus, behind the panels 8. Use of laminated high-strength/"ballistic" solar cell panels allow the present invention to function as a severe weather protective housing to enclosed electrical components. Such panels allow the invention to resist hurricane force winds, and protect these typically fragile electrical components against severe weather and flying debris.

Lower device 14 comprises equivalent elements to that of device 1, but located at a position on the pole 18 which is below device 1. The upper and lower inner supports 25 and 29 are sized to fit the pole 18 at locations along the length of the pole that have identical diameter. Upper and lower outer supports 27 and 31 are identically sized as well, so the lower device 14 upper and lower radial spacer (26 and 31) are also identically sized.

Figure 5:
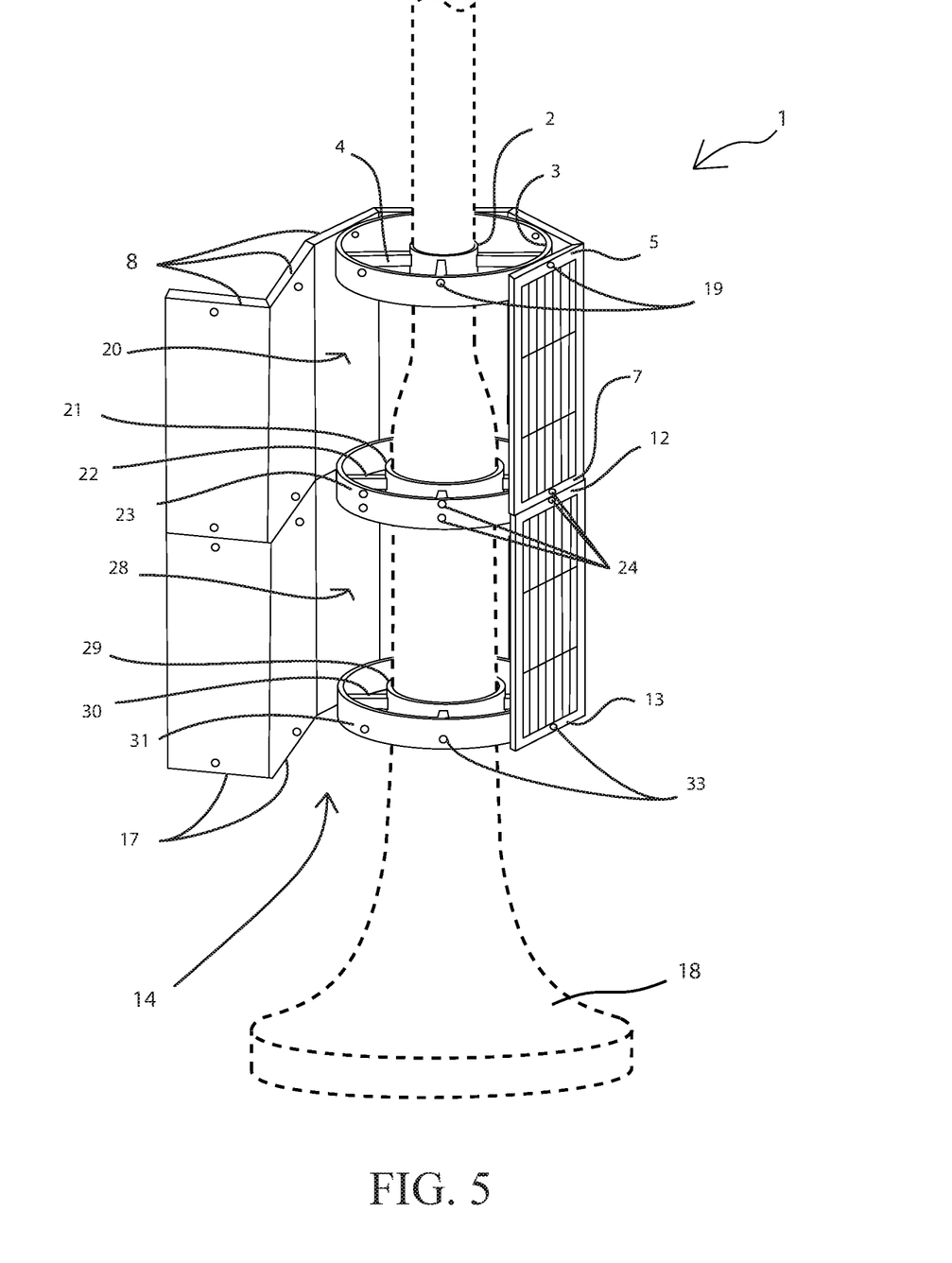
FIG. 5 shows a perspective view of a solar cell pole mounting apparatus with plural solar cell pole mounting devices installed on a pole, and with solar cell panels opened, to show an interior volume.

Referring now to FIG. 5, what is shown is a similar embodiment to that of FIG. 4, but where the upper device 1 and lower device 14 share the device (1)'s lower inner support 21 and outer support 23, rather than having a dedicated lower device upper inner and outer support (FIGS. 4, 25 and 27). The version depicted shows two tiers of lower support attachment features 24, but other contemplated embodiments only have one (19, as shown in FIG. 4), where the panels 8 and 17 simply connect to the single tier by co-engaging the features 19 with both their lower edge 7 and upper edge 12, respectively.

Figure 6:
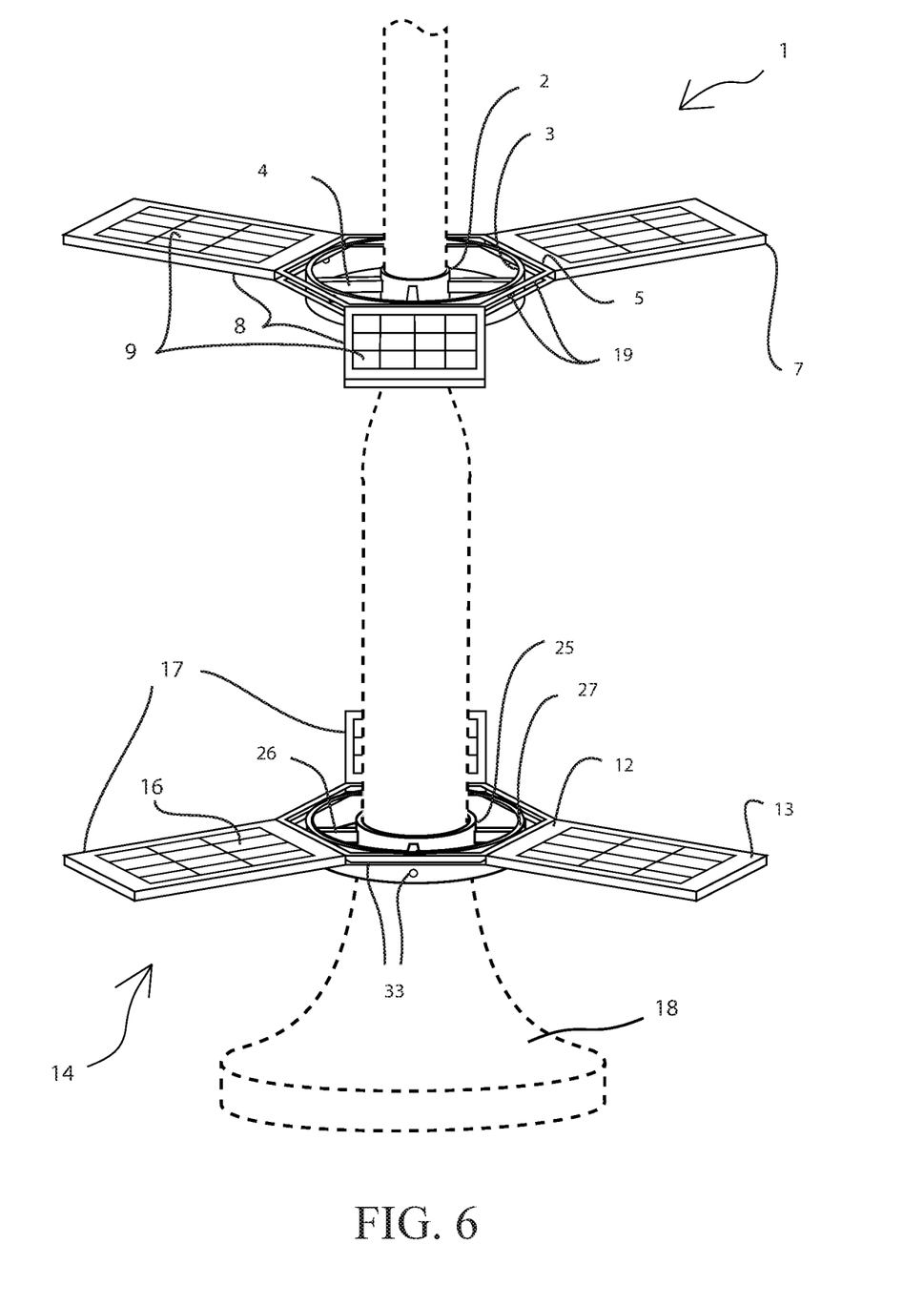
FIG. 6 shows a perspective view of a solar cell pole mounting apparatus with plural solar cell pole mounting devices installed on a pole, and with solar panel cell sets arranged perpendicularly to the length of the pole.

Referring now to FIG. 6, what is shown is an embodiment of a solar cell pole mounting apparatus which comprises sets 9 of solar cells that are disposed on panels 8 that are arranged horizontally. Like FIGS. 4 and 5, two devices 1 and 14 are engaged at desired locations along the length of a pole 18, with inner supports 2 and 25 sized to engage the diameter of the pole 18. Each device has an outer support 3 and 27 which maintains and locates the upper edge 5 and 12 of panels 8 and 17 at a desired radial distance from the pole 18, and maintains the outer support with respect to the inner support with a radial spacer 4 and 26 which is sizable to span the gap or radial difference between the radial sizes of the inner and outer supports (2 and 3; 25 and 27, respectively). As the sets 9 and 16 are arranged "vertically," these horizontally arranged panels 8 and 17 provide cantilever support such that the lower edge (7 and 13) of these panels (8 and 17) are maintained at a location, with respect to the length of the pole 18, that is similar to the location of their respective panel's upper edge (5 and 12).

Device 1 and 14 are arranged at angular offset to one another, about the pole 18, and the panels 8 and 17 of the devices are arranged with significantly large angular spaces between the panels. In this way, the shadow cast by the solar ray angle on the upper device 1 does not occlude the solar exposure of the lower device 14.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The invention claimed is:

1. An apparatus, comprising: A solar cell pole mounting device, the device comprising:
    an inner support, an outer support, and a radial spacer mechanism;
    the inner support being configured to locate the device to a preselected position along the length of a pole,
    the outer support being configured to locate solar cells in spaced relation to the inner support,
    spaced relation meaning arranged at a distance from the pole at a greater radial distance than the radial distance of the inner support and each of the inner and outer supports extending through lengths of approximately equal angular distance about the pole, respectively,
    the inner support being assembled and arranged to locate the device by radially-inward forceful engagement with respect to the peripheral face of the pole,
    the outer support being assembled and arranged to locate the cells by providing plural supporting features spaced at angularly offset intervals along the length of the outer support,
    such that the upper edge of the cells are proximate the location of the outer support, along the length of the pole, and
    the radial spacer mechanism being one assembled and arranged to suspend the outer support in spaced relation to the inner support, and limit the outer support against movement relative to the inner support;
    wherein the radial spacer mechanism is alternately sizeable to a preselected distance to radially space the outer support, with respect to the inner support, such that the outer support is sized to support and locate a preselected quantity, size, and specification of solar cell panel sets, and such that the inner support is sized to a pole of a preselected specification at a position along the pole which corresponds to the position along the pole of the outer support.

2. The apparatus of claim 1, wherein the inner support is alternately sizeable,
alternately sizeable meaning with reference to the diameter of the pole.

3. The apparatus of claim 2, wherein the inner support is alternately sizeable by being configured to be alternately sized between a size that is radially-larger-than and a size that is radially-fitting-to the diameter of the pole, by comprising a ring of material of sufficient pliancy to be alternately sized and of sufficient strength to be secured to the pole, when sized to as to be radially-fitting-to the diameter of the pole.

4. The apparatus of claim 3, wherein the inner support is sizeable to a size that is radially fitting to the diameter of the pole, by the ring of material comprising a belt that is sizeable by being circumferentially shortenable.

5. The apparatus of claim 3, wherein the inner support is sizeable to a size that is radially fitting to the diameter of the pole, by the ring of material comprising an alternately tightenable and openable clamp, one selected from a list comprising a hose clamp, a band hose clamp, a barrel band clamp, a jubilee clamp, a wormgear clamp, a t-bolt clamp, and a pipe hanger clamp.

6. The apparatus of claim 3, wherein the cells are arranged vertically into sets, each set being disposed on a plane for each set, each plane having a left and right edge, each right edge of a plane abutting the left edge of another of the planes, the planes being arranged about the pole, each plane facing a direction that is angularly offset from the directions faced by the planes which abut the edges of said plane.

7. The apparatus of claim 6, wherein the planes are of a quantity and size that they encircle and circumscribe the diameter of the outer support.

8. The apparatus of claim 7, wherein the planes fully encircle the pole and enclose an interior volume, whereby the interior volume of a size that is sufficiently large to contain electrical components necessary to provide electricity to any other electrical apparatus suitable to be powered by the apparatus.

9. The apparatus of claim 1, the solar cells having an upper and lower edge, the outer support being an upper outer support, and the apparatus further comprising a lower outer support, wherein upper outer support engages with the upper edge of the solar cells and wherein the lower outer support engages with the lower edge of the solar cells, such that the upper outer support and lower outer support locate the upper and lower edges of the solar cells at preselected radial distance from the pole.

10. The apparatus of claim 1, wherein the apparatus is modularly scalable with respect to the pole, by comprising plural instances of the devices, the devices being supplementarily interrelatable by being located to a common pole, such that the devices are co-extensive with respect to the size and shape of each of the devices, along the length of the pole.

11. the apparatus of claim 10, the solar cells having an upper and lower edge, and the devices being further co-extensive, co-extensive meaning the devices are successively arranged above and below one another along the length of the pole, the upper edge of the solar cells and outer supports being engaged for each respective support, by the lower edge of the solar cells being engaged with the outer support of one of the devices that is below the device to which its upper edge is engaged, respectively.

12. The apparatus of claim 1, wherein the apparatus is modularly scalable with respect to the pole, by comprising battery storage units that are that are sized and shaped to abut and be co-extensive with the device along the length of the pole, with respect to the size and shape of the outer support and solar cells.

13. The apparatus of claim 1, wherein the outer support and inner support are assembled and arranged to be alternately opened and closed, such that each device is configured to receive the diameter of the pole by radial entry through the outer and inner supports when opened, and is configured to locate the pole against radial exit from the inner and outer supports when closed.

14. The apparatus of claim 1, wherein the solar cells of each device are arranged vertically into sets, each set being disposed on a plane for each set, the planes of each device being parallel to one another and the planes each being arranged at an angle to the length of the pole which is one selected from a list comprising approximately perpendicular to the length of the pole and approximately perpendicular to gravity, each of the devices also being arranged such that the planes are angularly spaced about the pole, the spaces between the plane being angular spaces.

15. The apparatus of claim 14, the apparatus comprising plural devices, the devices being spaced at intervals along the length of the pole and angularly offset about the pole with respect to one another, such that the angular spaces between the panel sets of each device to not occlude the solar exposure of the device respectively below, and is not occluded from solar exposure by the shadow of the panel sets of the device respectively above.

16. The apparatus of claim 15, wherein each of the panels comprise an upper edge and a lower edge, the outer support being configured to locate each upper edge at approximately the same location along the length of the pole as the location of the inner support along the length of the pole, and wherein the apparatus supports the panel sets, such that the lower edge of each panel at a location, with respect to the length of the pole which is approximately the same location as the location of the upper edge.

17. The apparatus of claim 16, wherein the apparatus supports the panel sets by each device providing cantilever support to the panels of each respective device.

18. The apparatus of claim 1, wherein the solar panel sets comprise foldable solar panel sets.

19. An apparatus, comprising: A solar cell pole mounting device, the device comprising:
an inner support, an outer support, and a radial spacer mechanism;
the inner support being configured to locate the device to a preselected position along the length of a pole,
the outer support being configured to located solar cells in spaced relation to the inner support,
spaced relation meaning arranged at a distance from the pole at a greater radial distance than the radial distance of the inner support and each of the inner and outer supports extending through lengths of approximately equal angular distance about the pole, respectively,
the inner support being assembled and arranged to locate the device by radially-inward forceful engagement with respect to the peripheral face of the pole,
the outer support being assembled and arranged to locate the cells by providing plural supporting features spaced at angularly offset intervals along the length of the outer support,
such that the upper edge of the cells are proximate the location of the outer support, along the length of the pole, and
the radial spacer mechanism being one assembled and arranged to suspend the outer support in spaced relation to the inner support, and limit the outer support against movement relative to the inner support;

wherein the apparatus is modularly scalable with respect to the pole, by comprising plural instances of the devices, the devices being supplementarily interrelatable by being located to a common pole, such that the devices are co-extensive with respect to the size and shape of each of the devices, along the length of the pole, and the solar cells having an upper and lower edge, and the devices being further co-extensive, co-extensive meaning the devices are successively arranged above and below one another along the length of the pole, the upper edge of the solar cells and outer supports being engaged for each respective support, by the lower edge of the solar cells being engaged with the outer support of one of the devices that is below the device to which its upper edge is engaged, respectively.

20. An apparatus, comprising: A solar cell pole mounting device, the device comprising:

an inner support, an outer support, and a radial spacer mechanism;

the inner support being configured to locate the device to a preselected position along the length of a pole, the outer support being configured to locate solar cells in spaced relation to the inner support, spaced relation meaning arranged at a distance from the pole at a greater radial distance than the radial distance of the inner support and each of the inner and outer supports extending through lengths of approximately equal angular distance about the pole, respectively, the inner support being assembled and arranged to locate the device by radially-inward forceful engagement with respect to the peripheral face of the pole, the outer support being assembled and arranged to locate the cells by providing plural supporting features spaced at angularly offset intervals along the lengths of the outer support, such that the upper edge of the cells are proximate the location to the outer support, along the length of the pole, and the radial spacer mechanism being one assembled and arranged to suspend the outer support in spaced relation to the inner support, and limit the outer support against movement relative to the inner support, wherein the solar cells of each device arranged vertically into sets, each set being disposed on a plane for each set, the planes of each device being parallel to one another and the planes each being arranged at an angle to the length of the pole which is one selected from a list comprising approximately perpendicular to the length of the pole and approximately perpendicular to gravity, each of the devices also being arranged such that the planes are angularly spaced about the pole, the spaces between the plane being angular spaces.

21. An apparatus comprising: A solar cell pole mounting device, the device comprising:

an inner support, an outer support, and a radial spacer mechanism;

the inner support being configured to locate the device to a preselected position along the length of a pole, the outer support being configured to locate solar cells in spaced relation to the inner support, spaced relation meaning arranged at a distance from the pole at a greater radial distance than the radial distance of the inner support and each of the inner and outer supports extending through lengths of approximately equal angular distance about the pole, respectively, the inner support being assembled and arranged to locate the device by radially-inward forceful engagement with respect to the peripheral face of the pole, the outer support being assembled and arranged to locate the cells by providing plural supporting features spaced at angularly offset intervals along the length of the outer support, such that the upper edge of the cells are proximate the location of the outer support, along the length of the pole, and the radial spacer mechanism being one assembled and arranged to suspend the outer support in spaced relation to the inner support, and limit the outer support against movement relative to the inner support, wherein the inner support in alternately sizeable, alternately sizeable meaning with reference to the diameter of the pole;

wherein the inner support is alternately sizeable by being configured to be alternately sized between a size that is radially-larger-than and a size that is radially-fitting-to the diameter of the pole, by comprising a ring of a material of sufficient pliancy to be alternately sized and of sufficient strength to be secured to the pole, when sized to as to be radially-fitting-to the diameter of the pole, and wherein the cells are arranged vertically into sets, each set being disposed on a plane for each set, each plane having a left and right edge, each right edge of a plane abutting the left edge of another of the planes, the planes being arranged about the pole, each plane facing a direction that is angularly offset from the directions faced by the planes which abut the edges of said plane, and wherein the planes are of a quantity and size that they encircle and circumscribe the diameter of the outer support and enclose an interior volume of a size that is sufficiently large to contain electrical components necessary to provide electricity to any other electrical apparatus suitable to be powered by the apparatus, and wherein the interior volume is resistant to severe weather by the cells being of a type predetermined to be sufficiently rigid to provide protection against hurricane force winds and debris and solar exposure, whereby the device is configured to fully contain its electronics within the interior volume and serve as a weather protecting housing.

22. The apparatus of claim 21, wherein the type of cells comprise rigid laminated cells of a type that are sufficient to provide protection against hurricane force winds and debris and solar exposure.

* * * * *

UNITED STATES PATENT AND TRADEMARK OFFICE
CERTIFICATE OF CORRECTION

Page 1 of 1

PATENT NO. : 10,756,667 B2
APPLICATION NO. : 16/034348
DATED : August 25, 2020
INVENTOR(S) : Brian Iversen

It is certified that error appears in the above-identified patent and that said Letters Patent is hereby corrected as shown below:

In the Claims

Column 12, Line 23:
The word "in"
Should read:
"is"

Column 12, Lines 29-30 read:
"the diameter of a pole, by comprising a ring of a material of sufficient pliancy to..."
Should read:
"the diameter of a pole, by comprising a ring of material of sufficient pliancy to..."

Signed and Sealed this
Seventeenth Day of November, 2020

Andrei Iancu
*Director of the United States Patent and Trademark Office*